(12) United States Patent  
Dou et al.

(10) Patent No.: US 12,519,589 B2  
(45) Date of Patent: Jan. 6, 2026

(54) UPLINK TRANSMISSION RESOURCE SCHEDULING METHOD, BASE STATION, USER EQUIPMENT, AND COMMUNICATION SYSTEM

(71) Applicant: Honor Device Co., Ltd., Shenzhen (CN)

(72) Inventors: Zhitong Dou, Shenzhen (CN); Xiaochao Wei, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 233 days.

(21) Appl. No.: 18/546,716

(22) PCT Filed: May 7, 2022

(86) PCT No.: PCT/CN2022/091505  
§ 371 (c)(1),  
(2) Date: Aug. 16, 2023

(87) PCT Pub. No.: WO2023/005324  
PCT Pub. Date: Feb. 2, 2023

(65) Prior Publication Data  
US 2024/0154754 A1    May 9, 2024

(30) Foreign Application Priority Data  
Jul. 30, 2021 (CN) .......................... 202110870382.3

(51) Int. Cl.  
*H04L 5/00* (2006.01)  
*H04W 52/02* (2009.01)  
(Continued)

(52) U.S. Cl.  
CPC ....... *H04L 5/0048* (2013.01); *H04W 52/0229* (2013.01); *H04W 52/028* (2013.01); *H04W 72/0446* (2013.01); *H04W 72/1268* (2013.01)

(58) Field of Classification Search  
CPC ......... H04W 52/0216; H04W 52/0229; H04W 52/028; H04W 72/0446; H04W 72/1268; H04W 72/21; H04W 72/50  
(Continued)

(56) References Cited

U.S. PATENT DOCUMENTS 10,588,171 B2   3/2020  Ang et al.  
10,749,713 B2   8/2020  Sundararajan et al.  
(Continued)

FOREIGN PATENT DOCUMENTS

CN       101841914 A      9/2010  
CN       106550457 A      3/2017  
(Continued)

OTHER PUBLICATIONS

Spreadtrum Communications, "Discussion on cross-slot scheduling for UE power saving", 3GPP TSG RAN WG1 Meeting #97, R1-1906372, Reno, USA, May 13-May 17, 2019, 7 pages.

*Primary Examiner* — Joseph Arevalo  
(74) *Attorney, Agent, or Firm* — Conley Rose, P.C.

(57) ABSTRACT

An uplink transmission resource scheduling method, a base station, user equipment, and a communication system. The base station receives an uplink transmission resource scheduling request sent by the user equipment, and then determines whether each preset parameter meets a preset resource scheduling condition. The base station schedules an uplink transmission resource within each second period when all of the preset parameters meet the preset resource scheduling condition. The second period includes N consecutive default first periods. The base station centrally schedules all uplink transmission resources corresponding to the N first periods within an $i^{th}$ first period among the N first periods. The base station can schedule uplink transmission resources by cross-slot scheduling, and on the basis of meeting requirements on a transmission rate of uplink data and an amount of uplink (Continued)

data, power consumption for transmitting a unit data amount of uplink data is reduced.

20 Claims, 10 Drawing Sheets

(51) Int. Cl.
*H04W 72/0446* (2023.01)
*H04W 72/1268* (2023.01)

(58) Field of Classification Search
USPC ....... 370/329, 330, 318, 230, 235, 336, 331, 370/311
See application file for complete search history.

(56) References Cited

U.S. PATENT DOCUMENTS

| | | | |
|---|---|---|---|
| 10,917,216 B2 | 2/2021 | Su et al. | |
| 11,304,224 B2 | 4/2022 | Bagheri et al. | |
| 11,477,734 B2 | 10/2022 | Lin | |
| 11,665,685 B2 | 5/2023 | Jiang et al. | |
| 2017/0027011 A1* | 1/2017 | Chae | H04W 76/14 |
| 2017/0231011 A1* | 8/2017 | Park | H04W 74/006 |
| 2019/0200363 A1* | 6/2019 | Rajendran | H04W 52/325 |
| 2020/0068607 A1 | 2/2020 | Jiang et al. | |
| 2021/0377698 A1* | 12/2021 | Manolakos | H04W 4/029 |
| 2022/0182160 A1* | 6/2022 | Su | H04B 17/309 |
| 2022/0217654 A1* | 7/2022 | Kang | H04W 52/346 |
| 2022/0217758 A1 | 7/2022 | Li et al. | |
| 2023/0034070 A1 | 2/2023 | Dai et al. | |

FOREIGN PATENT DOCUMENTS

| | | |
|---|---|---|
| CN | 108184267 A | 6/2018 |
| CN | 108365928 A | 8/2018 |
| CN | 110602769 A | 12/2019 |
| CN | 110612778 A | 12/2019 |
| CN | 111345097 A | 6/2020 |
| CN | 112188599 A | 1/2021 |
| CN | 113747553 A | 12/2021 |
| CN | 113785622 A | 12/2021 |
| CN | 111837430 B | 3/2022 |
| WO | 2020087467 A1 | 5/2020 |
| WO | 2021063862 A1 | 4/2021 |
| WO | 2021102768 A1 | 6/2021 |

* cited by examiner

UPLINK TRANSMISSION RESOURCE SCHEDULING METHOD, BASE STATION, USER EQUIPMENT, AND COMMUNICATION SYSTEM

CROSS-REFERENCE TO RELATED APPLICATIONS

This is a U.S. National Stage of International Application No. PCT/CN2022/091505 filed on May 7, 2022, which claims priority to Chinese Patent Application No. 202110870382.3, filed with the China National Intellectual Property Administration on Jul. 30, 2021, both of which are incorporated herein by reference in their entireties.

TECHNICAL FIELD

This application relates to the field of communication technologies, and in particular, to an uplink transmission resource scheduling method, a base station, user equipment, and a communication system.

BACKGROUND

With continuous development of the fifth generation mobile communication technology (5th generation mobile networks, 5G), more 5G_user equipments (user equipment, UE) for 5G networks have begun to be widely used. Compared with the fourth generation mobile communication technology (4th generation of mobile phone mobile communication technology standards, 4G)_UE, the 5G_UE is greatly increased in communication power consumption. Correspondingly, the increase in communication power consumption increases consumption of a battery capacity, making power consumption of the 5G_UE faster.

The communication power consumption of the 5G_UE mainly includes uplink power consumption caused by uplink data transmission and downlink power consumption caused by downlink data transmission. A receive (Receive, RX) path may be disabled quickly after the 5G_UE receives downlink control information (Downlink Control Information, DCI) sent by a base station, to reduce the communication power consumption of the 5G_UE, or when the 5G_UE demodulates the DCI and when the 5G_UE enables the RX path, the base station is caused to configure an appropriate signal bandwidth based on a quantity of resource blocks (Resource Block, RB) for transmitting downlink data, to reduce the communication power consumption of the 5G_UE. However, an effect of reducing the communication power consumption of the 5G_UE by reducing the downlink power consumption of the 5G_UE is not significant.

SUMMARY

This application provides an uplink transmission resource scheduling method, a base station, user equipment, and a communication system, to improve an effect of reducing communication power consumption of 5G_UE by reducing uplink power consumption.

According to a first aspect, an embodiment of this application provides an uplink transmission resource scheduling method, where the method includes:
receiving, by a base station, an uplink transmission resource scheduling request sent by user equipment;
determining, by the base station after receiving the uplink transmission resource scheduling request, whether each preset parameter meets a preset resource scheduling condition;
scheduling, by the base station, an uplink transmission resource within each first period when at least one of the preset parameters does not meet the preset resource scheduling condition, where the first period is a default scheduling period of the base station; and
scheduling, by the base station, an uplink transmission resource within each second period when all of the preset parameters meet the preset resource scheduling condition, where the second period includes N consecutive first periods, the base station centrally schedules all uplink transmission resources corresponding to the N first periods within an $i^{th}$ first period among the N first periods, N≥2, and N≥i≥1.

In this way, the base station can schedule an uplink transmission resource for the user equipment through cross-slot scheduling, so that when the user equipment transmits, based on the uplink transmission resource scheduled by the base station, uplink data to be transmitted, on the basis of meeting requirements on a transmission rate of uplink data and an amount of uplink data, power consumption for transmitting a unit data amount of uplink data is reduced, thereby reducing uplink power consumption of 5G_UE to reduce overall communication power consumption.

In an implementation, the method further includes:
calculating, by the base station, a resource scheduling parameter based on the preset parameters and the preset resource scheduling condition, where the resource scheduling parameter is 1 when all of the preset parameters meet the preset resource scheduling condition, and the resource scheduling parameter is 0 when at least one of the preset parameters does not meet the preset resource scheduling condition; and
scheduling, by the base station, the uplink transmission resource based on the resource scheduling parameter.

In this way, the base station can identify different uplink transmission resource scheduling modes by using the resource scheduling parameters 1 and 0, and therefore, can accurately schedule the uplink transmission resource according to the different modes.

In an implementation, the preset parameters include a maximum power value supported by the user equipment, a delay mode of the user equipment, and a currently idle uplink transmission resource of the base station.

In an implementation, determining, by the base station after receiving the uplink transmission resource scheduling request, whether the maximum power value supported by the user equipment meets the preset resource scheduling condition includes:
obtaining, by the base station, the maximum power value supported by the user equipment from the uplink transmission resource scheduling request; obtaining, by the base station, a network parameter;
calculating, by the base station, uplink data transmission power based on the network parameter;
calculating, by the base station, a difference between the uplink data transmission power and the maximum power value supported by the user equipment; and
determining, by the base station, whether the difference is greater than or equal to a preset threshold, to determine whether the maximum power value supported by the user equipment meets the preset resource scheduling condition, where when the difference is greater than or equal to the preset threshold, the maximum power value supported by the user equipment meets the preset resource scheduling condition.

In this way, the maximum power value supported by the user equipment can be used as a preset parameter for setting an uplink transmission resource scheduling mode. Therefore, only when power headroom of the user equipment is sufficiently large, that is, when more RB resources can be used, the uplink transmission resource is scheduled through cross-slot scheduling, and only in this case, the user equipment does not waste more RB resources allocated during cross-slot scheduling, thereby effectively reducing uplink power consumption.

In an implementation, determining, by the base station after receiving the uplink transmission resource scheduling request, whether the delay mode of the user equipment meets the preset resource scheduling condition includes:
 obtaining, by the base station, the delay mode of the user equipment from the uplink transmission request; and
 determining, by the base station, whether the delay mode is a non-low-delay mode, to determine whether the delay mode meets the preset resource scheduling condition, where when the delay mode is a non-low-delay mode, the delay mode meets the preset resource scheduling condition.

In this way, the delay mode set for the user equipment can be used as a reference parameter for setting an uplink transmission resource scheduling mode. Therefore, only when the user equipment has a relatively low-delay requirement, that is, when a relatively long transmission time interval is allowed, the uplink transmission resource is scheduled through cross-slot scheduling, and only in this case, the user equipment can allow a relatively long transmission time interval generated by the cross-slot scheduling, so that a basic transmission requirement of the user equipment on uplink data can be met.

In an implementation, determining, by the base station after receiving the uplink transmission resource scheduling request, whether the currently idle uplink transmission resource of the base station meets the preset resource scheduling condition includes:
 obtaining, by the base station, the currently idle uplink transmission resource; and
 determining, by the base station, a status of the currently idle uplink transmission resource, to determine whether the currently idle uplink transmission resource of the base station meets the preset resource scheduling condition, where when the currently idle uplink transmission resource is in an unrestricted state, the currently idle uplink transmission resource of the base station meets the preset resource scheduling condition.

In this way, the currently idle uplink transmission resource of the base station can be used as a reference parameter for setting an uplink transmission resource scheduling mode. Therefore, only when the base station currently has sufficient idle uplink transmission resources, the base station can allocate more RB resources to the user equipment, that is, the uplink transmission resource can be scheduled through cross-slot scheduling.

In an implementation, the uplink transmission resource scheduling request includes an amount of uplink data to be transmitted, and the method further includes:
 obtaining, by the base station, the amount of uplink data to be transmitted from the uplink transmission resource scheduling request; and
 calculating, by the base station based on the amount of uplink data to be transmitted, the first periods and an uplink transmission resource to be scheduled within each of the first periods.

In this way, the base station can first calculate, based on the amount of uplink data to be transmitted, the first periods and an uplink transmission resource correspondingly scheduled within each of the first periods, to provide a scheduling basis for subsequent cross-slot scheduling and facilitate subsequent calculation of related parameters of the cross-slot scheduling, thereby helping improve efficiency of generating cross-slot scheduling policy.

According to a second aspect, this application further provides an uplink transmission resource scheduling method, where the method includes:
 sending, by user equipment, an uplink transmission resource scheduling request to a base station;
 receiving, by the user equipment, a resource scheduling result sent by the base station, where the base station schedules an uplink transmission resource based on the method described according to the first aspect; and
 transmitting, by the user equipment based on the resource scheduling result by using a corresponding uplink transmission resource, uplink data to be transmitted.

In this way, once a user has a requirement of transmitting uplink data, the base station can schedule an uplink transmission resource for the user equipment through cross-slot scheduling, so that when the user equipment transmits, based on the uplink transmission resource scheduled by the base station, uplink data to be transmitted, on the basis of meeting requirements on a transmission rate of uplink data and an amount of uplink data, power consumption for transmitting a unit data amount of uplink data is reduced, thereby reducing uplink power consumption of 5G_UE to reduce overall communication power consumption.

In an implementation, the uplink transmission resource scheduling request includes a maximum power value supported by the user equipment and a delay mode of the user equipment.

In this way, the base station can accurately determine an uplink transmission resource scheduling policy based on the maximum power value supported by the user equipment and the delay mode of the user equipment, thereby ensuring a transmission requirement of the user equipment on uplink data.

According to a third aspect, this application further provides a base station, where the base station schedules an uplink transmission resource based on the method described according to the first aspect.

According to a fourth aspect, this application further provides user equipment, where the user equipment transmits uplink data to be transmitted based on the method described according to the second aspect.

According to a fifth aspect, this application further provides a communication system, including a base station and user equipment, where
 the user equipment sends an uplink transmission resource scheduling request to the base station;
 the base station schedules an uplink transmission resource based on the method described according to the first aspect, and sends a resource scheduling result to the user equipment; and
 the user equipment transmits, based on the resource scheduling result by using a corresponding uplink transmission resource, uplink data to be transmitted.

BRIEF DESCRIPTION OF DRAWINGS

To describe the technical solutions of this application more clearly, the following briefly describes the accompanying drawings required in the embodiments. Apparently, a person of ordinary skill in the art may derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the disclosed embodiments without creative efforts shall fall within the protection scope of the present invention.

Figure 1:
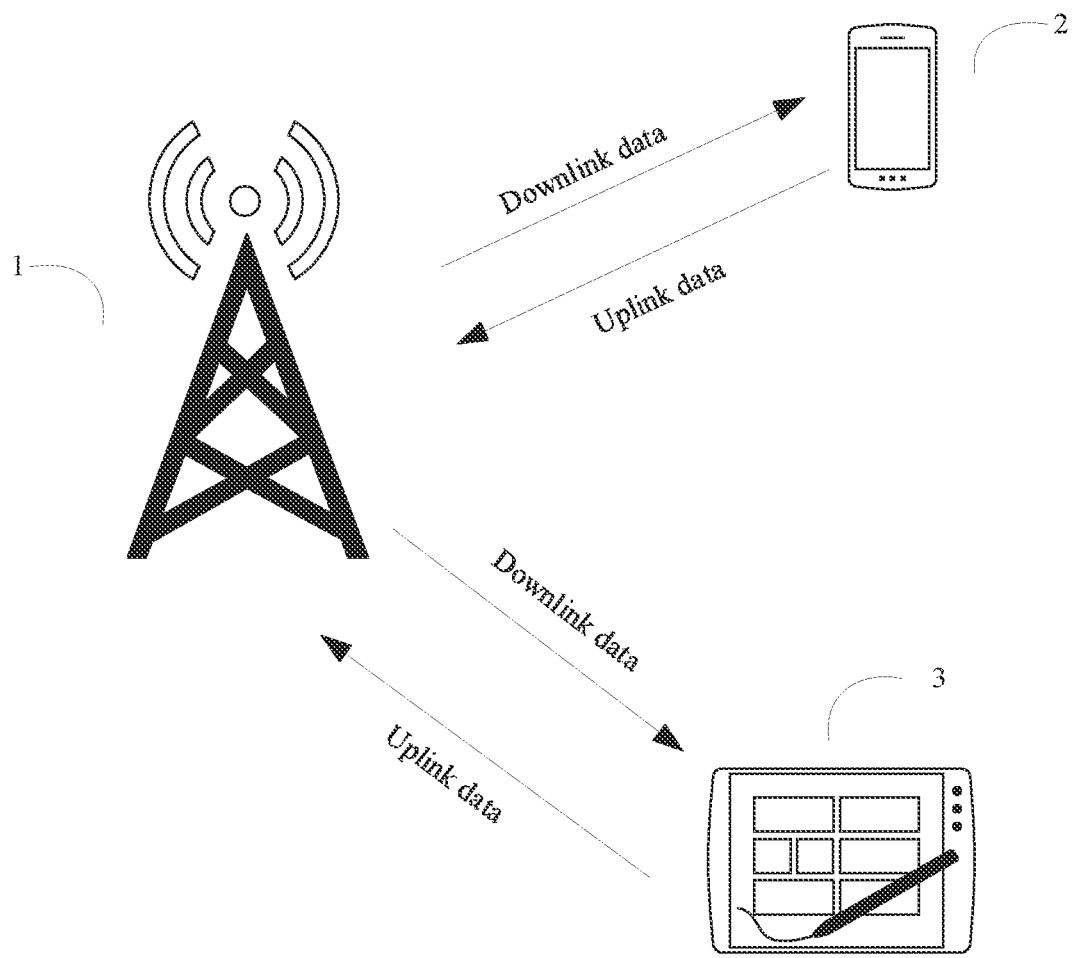
FIG. 1 is a schematic diagram of a communication system according to an embodiment of this application.

FIG. 1 shows a communication system according to an embodiment of this application. The communication system includes a base station and at least one 5G_user equipment. The 5G_user equipment may be a mobile phone, a tablet computer, a smart wearable device, an intelligent vehicle, or the like. As shown in FIG. 1, the communication system includes a base station 1, a mobile phone 2, and a tablet computer 3. The base station 1 transmit data with the mobile phone 2 and the tablet computer 3. Data sent by the mobile phone 2 or the tablet computer 3 to the base station 1 is referred to as uplink data. Data sent by the base station 1 to the mobile phone 2 or the tablet computer 3 is referred to as downlink data. When sending uplink data to the base station 1, the mobile phone 2 and the tablet computer 3 need to use an uplink transmission resource allocated by the base station 1.

Figure 2:
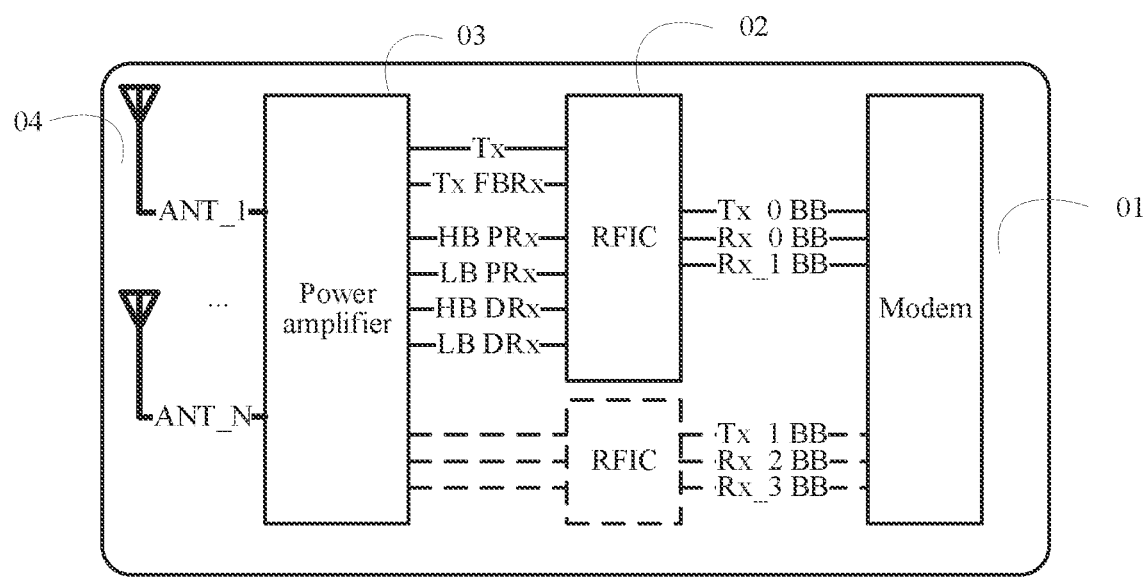
FIG. 2 is a schematic structural diagram of a transmitting system in 5G_UE according to an embodiment of this application.

FIG. 2 is a schematic structural diagram a transmitting system in 5G_UE according to an embodiment of this application. As shown in FIG. 2, the transmitting system includes a modem (modem) 01, a radio frequency integrated circuit (radio-frequency integrated circuit, RFID) 02, a power amplifier (power amplifier, PA) 03, and an antenna 04. For an uplink data transmission process: The modem 01 is configured to convert a digital signal into an analog signal. The radio frequency integrated circuit 02 is configured to modulate an intermediate frequency sine wave signal by using a baseband signal, and the intermediate frequency signal is then shifted through a frequency mixer to a required radio frequency transmission frequency to obtain a radio frequency signal. The power amplifier 03 is provided at a front end of the radio frequency integrated circuit 02, and is configured to amplify a low-power radio frequency signal generated by a modulation oscillator circuit to obtain sufficiently large radio frequency output power, and feed it to the antenna 04. The antenna 04 is configured to send the amplified radio frequency signal.

When each device in the transmitting system is running, corresponding power consumption is generated, and such power consumption constitutes uplink power consumption of the 5G_UE. Working data of each device in the transmitting system is recorded by using an example in which the 5G_UE transmits uplink data in the 7th and 8th bands of the 5G new radio access technology (the 7th and 8th band of 5G New Radio, NR_band 7 and 8), and a wireless 6 GHz band power amplifier (sub6_PA) is used for the power amplifier 03. Details are as follows:

As shown in Table 1, power consumption of each of the modem 01 and the radio frequency integrated circuit 02 is mainly related to a data amount of uplink data to be transmitted. For example, when the data amount of the uplink data is 1t, the power consumption of each of the modem 01 and the radio frequency integrated circuit 02 is approximately 120 mA.

TABLE 1

| Power consumption data of RFIC and Modem | | | | | |
|---|---|---|---|---|---|
| NR_78_RFIC_low power | AFE (mW) | SEDES (mW) | DIG (mW) | RFIC (mW) | Current (mA) |
| NR_1T | 96 | 24 | 58 | 178 | 64 |
| NR_2T | 81 | 20 | 46 | 147 | 53 |
| NR_3T | 125 | 20 | 75 | 220 | 79 |
| NR_4T | 220 | 20 | 110 | 350 | 126 |
| | Modem + PLL (mA) | | Mem (mA) | | Sedes (mA) |
| NR_1T | 44 | | 2 | | 11 |
| NR_2T | 44 | | 2 | | 11 |
| NR_3T | | | 2 | | 11 |
| NR_4T | | | 2 | | 11 |

As shown in Table 2, higher transmit power of the power amplifier 03 indicates higher corresponding power consumption. The power consumption of each of the modem 01 and the radio frequency integrated circuit 02 is negligibly affected by the transmit power. Therefore, when the data amount of the uplink data is fixed, the power consumption of each of the modem 01 and the radio frequency integrated circuit 02 may be used as a fixed value. It can be learned that, when the data amount of the uplink data is fixed, a change in the uplink power consumption mainly depends on the power consumption of the power amplifier 03, and a change in the power consumption of the power amplifier 03 mainly depends on the transmit power.

TABLE 2

Power consumption data of PA

| Power (dBm) | OUTER_16QAM | Power (dBm) | Power consumption (mA) | Power (dBm) | Power consumption (mA) | Power (dBm) | Power consumption (mA) |
|---|---|---|---|---|---|---|---|
| 23.5 | 725 | 17.5 | 200 | 11.5 | 110 | 5.5 | 45 |
| 22.5 | 625 | 16.5 | 175 | 10.5 | 95 | 4.5 | 40 |
| 21.5 | 525 | 15.5 | 150 | 9.5 | 75 | 3.5 | 40 |
| 20.5 | 400 | 14.5 | 140 | 8.5 | 65 | 2.5 | 40 |
| 19.5 | 300 | 13.5 | 135 | 7.5 | 60 | 1.5 | 40 |
| 18.5 | 250 | 12.5 | 125 | 6.5 | 50 | 0 | 40 |

The transmission of the uplink data is a process corresponding to a period of time (transmission time), but the transmit power disclosed in Table 2 corresponds only to a time node of this process. If only the transmit power is used as a standard for calculating power consumption, the calculated power consumption is only instantaneous power consumption corresponding to this time node. The power consumption data recorded in Table 2 are all instantaneous power consumption. As shown in Table 3, a larger modulation and coding scheme (Modulation and Coding Scheme, MCS) value corresponding to the modem 01 indicates a higher uplink data transmission rate. The MCS value is related to the transmit power, and higher transmit power indicates a larger MCS value. In other words, higher transmit power indicates a higher uplink data transmission rate.

TABLE 3

Correspondence between uplink transmission rate and MCS

| MCS | Rate (M/s) (FRB_224RB) |
|---|---|
| 25 | 101 |
| 24 | 96 |
| 23 | 91 |
| 22 | 86 |
| 21 | 78 |
| 20 | 75 |
| 19 | 72 |
| 18 | 68 |
| 17 | 63 |
| 16 | 58 |
| 15 | 55 |
| 14 | 52 |
| 13 | 49 |
| 12 | 44 |
| 11 | 38 |
| 10 | 35 |
| 9 | 32 |
| 8 | 29 |
| 7 | 26 |
| 6 | 23 |
| 5 | 20 |
| 4 | 16 |
| 3 | 14 |
| 2 | 12 |

Further, different transmit power causes different uplink data transmission rates, and causes different transmission times for transmitting uplink data. For example, higher transmit power indicates a higher transmission rate and a shorter transmission time. On the contrary, lower transmit power indicates a lower transmission rate and a longer transmission time. Obviously, the instantaneous power consumption can describe power consumption of only a time node (starting node) in the transmission time corresponding to the uplink data, and cannot well describe power consumption corresponding to the overall transmission time. Therefore, use of the instantaneous power consumption as a criterion for uplink power consumption is inaccurate.

To better represent the uplink power consumption, bit power consumption is used in this embodiment to describe the uplink power consumption. The following formula may be used to express the bit power consumption: $P=f/p$, where P represents the bit power consumption (mA/MBIT), f represents total power consumption (mA) of the transmitting system, and p represents the transmission rate (M/s), that is, the bit power consumption represents power consumption corresponding to transmission of a unit amount of data. The transmission rate is calculated based on the transmit power, the data amount of the uplink data, and the transmission time. Therefore, the bit power consumption can relatively completely show a relationship among the total power consumption, the transmit power, the data amount of the uplink data, and the transmission time, thereby more accurately representing the uplink power consumption.

Figure 3:
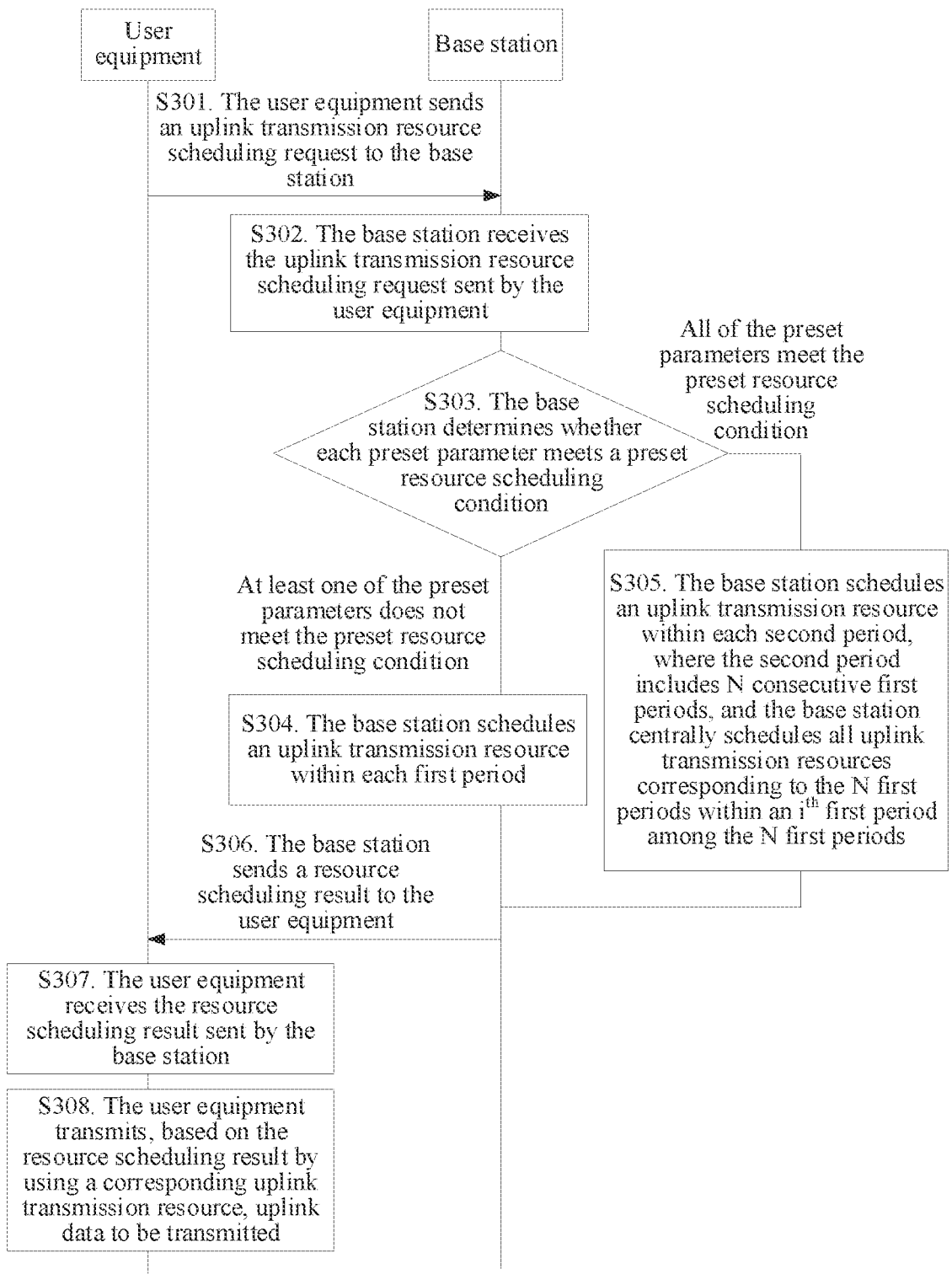
FIG. 3 is a flowchart of an uplink transmission resource scheduling method according to an embodiment of this application.

FIG. 3 is a flowchart of an uplink transmission resource scheduling method according to an embodiment of this application. The process specifically includes the following steps:

S301. User equipment sends an uplink transmission resource scheduling request to a base station.

S302. The base station receives the uplink transmission resource scheduling request sent by the user equipment.

S303. The base station determines whether each preset parameter meets a preset resource scheduling condition.

S304. The base station schedules an uplink transmission resource within each first period when at least one of the preset parameters does not meet the preset resource scheduling condition.

S305. The base station schedules an uplink transmission resource within each second period when all of the preset parameters meet the preset resource scheduling condition, where the second period includes N consecutive first periods, the base station centrally schedules all uplink transmission resources corresponding to the N first periods within an $i^{th}$ first period among the N first periods.

S306. The base station sends a resource scheduling result to the user equipment.

S307. The user equipment receives the resource scheduling result sent by the base station.

S308. The user equipment transmits, based on the resource scheduling result by using a corresponding uplink transmission resource, uplink data to be transmitted.

Figure 4:
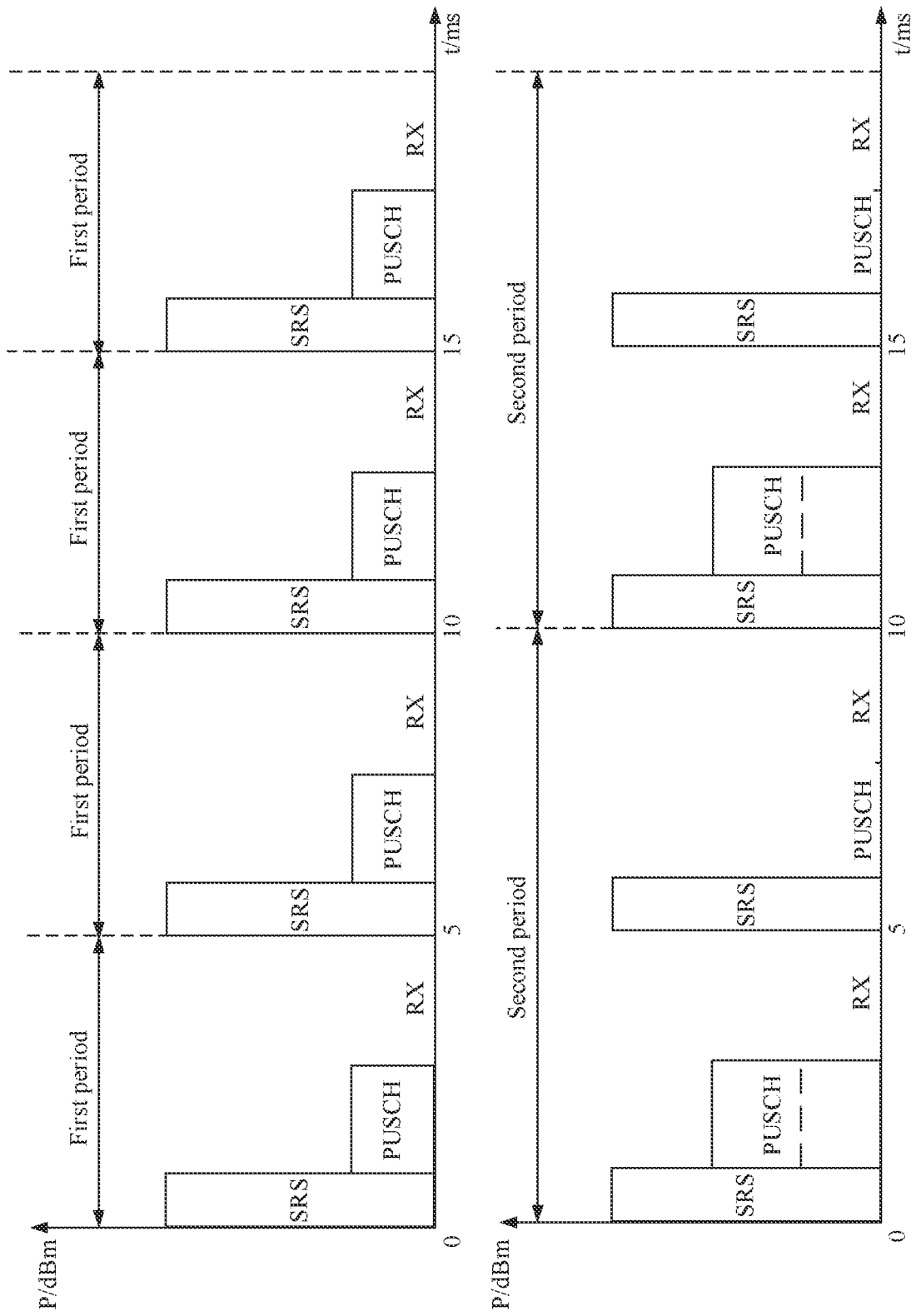
FIG. 4 is a schematic diagram of an uplink transmission resource scheduling mode according to an embodiment of this application.

The user equipment (5G_UE) needs to use the uplink transmission resource to transmit the uplink data. The user equipment cannot directly call the uplink transmission resource, but requires the base station to call the uplink transmission resource for the user equipment. Therefore, if the user equipment generates uplink data to be transmitted, the user equipment first needs to send an uplink transmission resource scheduling request to the base station, to request the base station to schedule the corresponding uplink transmission resource for the user equipment. Usually, the base station determines, based on a subcarrier spacing (subcarrier spacing, SCS), a period for scheduling an uplink transmission resource. In this embodiment, a scheduling period determined based only on an SCS is referred to as a first period, as shown by a first histogram in FIG. 4. In an example, the SCS is 30 kHz, and the base station performs scheduling with 5 ms as a period. Each first period includes three slots (Slot), respectively corresponding to a sounding reference signal (Sounding Reference Signal, SRS), a physical uplink shared channel (Physical Uplink Shared Channel. PUSCH) and RX. The base station schedules an uplink transmission resource in a PUSCH slot of each first period, and a quantity of uplink transmission resources that need to be scheduled needs to be determined based on an amount of uplink data to be transmitted by the user equipment. Therefore, the uplink transmission resource scheduling request carries the amount of uplink data to be transmitted, and the base station can determine, based on the amount of uplink data to be transmitted, an uplink transmission resource that needs to be scheduled within each second period. As shown in FIG. 4, uplink transmission resources scheduled within each first period are 15 resource blocks (Resource Block, RB).

Figure 5:
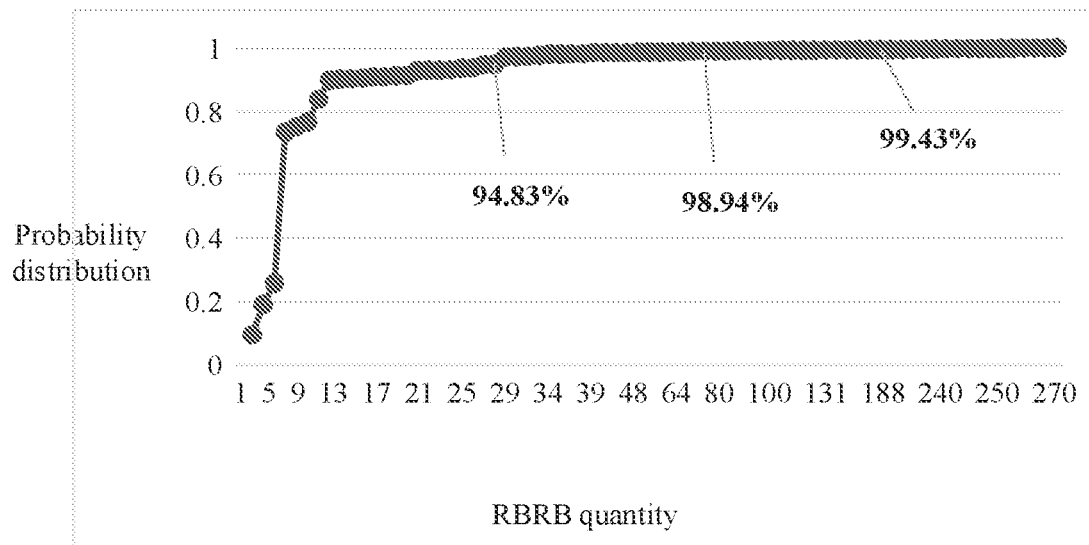
FIG. 5 shows a probability distribution status of a quantity of uplink transmission resources used by 5G_UE according to an embodiment of this application.

FIG. 5 shows a probability distribution status of a quantity of uplink transmission resources used by 5G_UE. A probability that the 5G_UE uses uplink transmission resources of less than 25 RBs is as high as 95%. In other words, a data amount of uplink data to be transmitted by the 5G_UE is usually small. Therefore, relatively fewer uplink transmission resources are used, and corresponding transmit power is relatively low and has a large gap with the maximum power allowed by the 5G_UE in a protocol, that is, power headroom of the 5G_UE is also relatively sufficient. Therefore, more uplink transmission resources can be allocated to the 5G_UE, to use higher transmit power to transmit the uplink data. This provides a basis for the uplink transmission resource scheduling mode of cross-slot scheduling.

Cross-slot scheduling means that the base station schedules uplink transmission resources every N consecutive first periods, that is, the second period (the second period includes N consecutive first periods) is used as a scheduling period to schedule the uplink transmission resources. The uplink transmission resources are centrally scheduled within an $i^{th}$ first period in the second period. The second period includes N PUSCH slots, and all uplink transmission resources corresponding to the N first periods are scheduled only in a PUSCH slot within the $i^{th}$ first period. Resource scheduling of two adjacent second periods is equivalent to crossing N PUSCH slots. Therefore, in this embodiment, such an uplink transmission resource scheduling mode is referred to as cross-slot scheduling.

After receiving the uplink transmission resource scheduling request, the base station needs to determine a corresponding uplink transmission resource scheduling policy based on preset parameters. In this embodiment, the preset parameters may be a maximum power value supported by the user equipment, a delay mode of the user equipment, and a currently idle uplink transmission resource of the base station. The base station may determine, based on a logic judgment flowchart shown in FIG. 6, whether each of the preset parameters meets a preset resource scheduling condition. The uplink transmission resource scheduling request sent by the user equipment to the base station carries information such as a capability of the user equipment and a requirement on uplink data transmission, for example, the maximum power value supported by the user equipment and the delay mode. In addition, the base station may obtain a currently idle uplink resource based on an occupied uplink resource.

Figure 6:
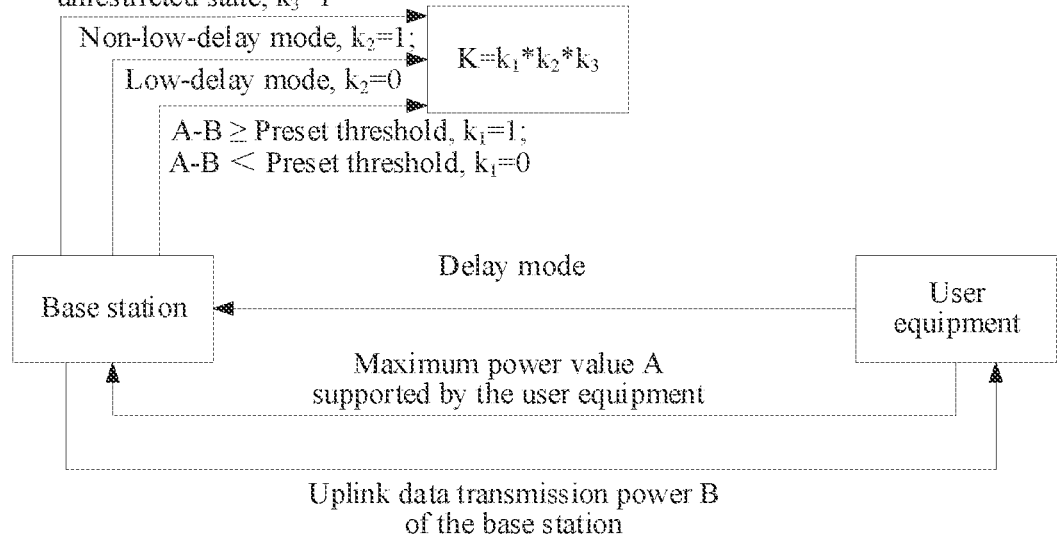
FIG. 6 is a logic block diagram showing that a base station calculates a resource scheduling parameter according to an embodiment of this application.

A resource scheduling parameter may be set to represent whether a preset parameter meets a preset resource scheduling condition. For example, if $k_i$ represents a resource scheduling parameter corresponding to an $i^{th}$ preset parameter, $k_i=1$ indicates that the preset parameter meets the preset resource scheduling condition, and $k_i=$) indicates that the preset parameter does not meet the preset resource scheduling condition. As shown in FIG. 6, the maximum power value supported by the user equipment is used as a first preset parameter for determining, the delay mode of the user equipment is used as a second preset parameter for determining, and the currently idle uplink transmission resource of the base station is used as a third preset parameter for determining. In terms of the maximum power value supported by the user equipment, when a difference between the maximum power value (denoted by A) supported by the user equipment and uplink data transmission power (denoted by B) of the base station is less than a preset threshold (for example, 3 dB), the preset resource scheduling condition is not met, and in this case, $k_1=0$. On the contrary, when a difference between the maximum power value (denoted by A) supported by the user equipment and uplink data transmission power (denoted by B) of the base station is greater than or equal to a preset threshold (for example, 3 dB), the preset resource scheduling condition is met, and in this case, $k_2=1$. In terms of the delay mode of the user equipment, when the delay mode is a low-delay mode, the preset resource scheduling condition is not met, and in this case, $k_2=0$. On the contrary, when the delay mode is a non-low-delay mode, the preset resource scheduling condition is met, and in this case, $k_2=1$. In terms of the currently idle uplink resource of the base station, when the currently idle uplink resource is in a restricted state, the preset resource scheduling condition is not met, and in this case, $k_3=0$. On the contrary, the when currently idle uplink resource is in an unrestricted state, the preset resource scheduling condition is met, and in this case, $k_3=1$. The base station integrates the values of $k_1$, $k_2$, and $k_3$ to calculate a resource scheduling parameter K, that is, $K=k_1*k_2*k_3$. Only when $k_1$, $k_2$, and $k_3$ are all 1. $K=1$; otherwise, as long as one of $k_1$, $k_2$, and $k_3$ is 0, $K=0$.

When $k=0$, the base station still follows a default resource scheduling mode, that is, still uses the first period as a scheduling period, and schedules uplink transmission resources within each first period. When $k=1$, the base station enables a cross-slot scheduling mode, that is, uses the second period as a scheduling period, and schedules uplink transmission resources within each second period.

Figure 7:
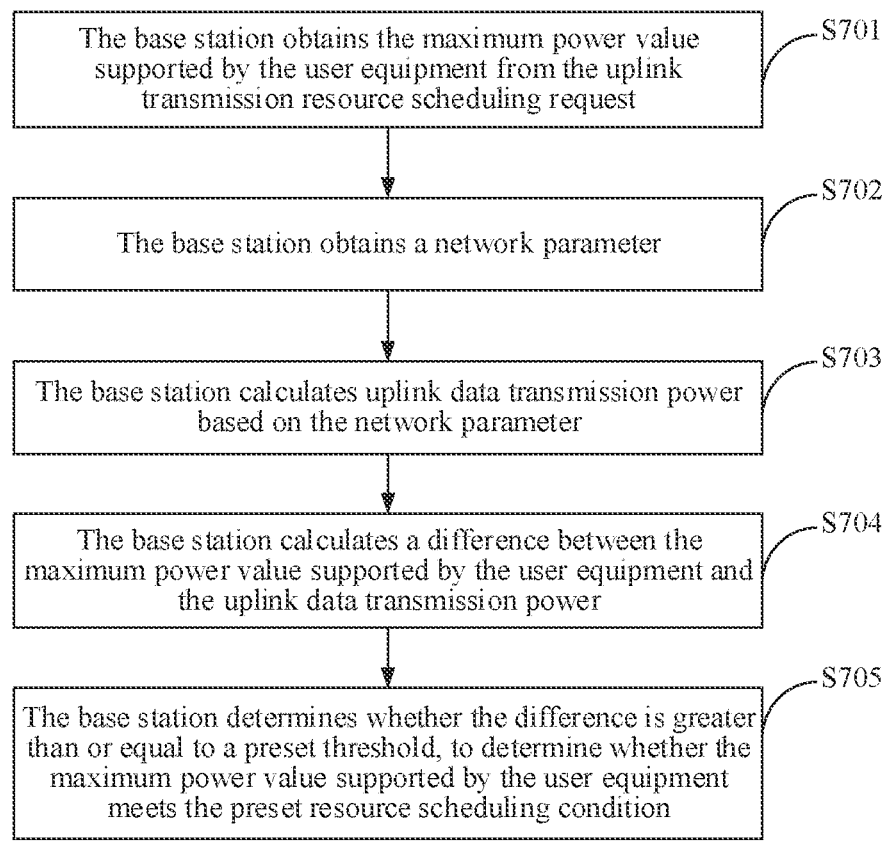
FIG. 7 is a flowchart of a method for comparing a maximum power value supported by user equipment with a preset resource scheduling condition according to an embodiment of this application.

In some embodiments, the uplink transmission resource scheduling request includes the maximum power value supported by the user equipment. In this case, the base station determines, based on a method shown in FIG. 7, whether the maximum power value supported by the user equipment meets the preset resource scheduling condition.

S701. The base station obtains the maximum power value supported by the user equipment from the uplink transmission resource scheduling request.

S702. The base station obtains a network parameter.

S703. The base station calculates uplink data transmission power based on the network parameter.

S704. The base station calculates a difference between the uplink data transmission power and the power headroom.

S705. The base station determines whether the difference is greater than or equal to a preset threshold. When the difference is greater than or equal to the preset threshold, the maximum power value supported by the user equipment meets the preset resource scheduling condition. When the difference is less than the preset threshold, the maximum power value supported by the user equipment does not meet the preset resource scheduling condition.

The base station first obtains the maximum power value supported by the user equipment from the uplink transmission resource scheduling request, and denotes it as A. The base station obtains a network parameter, such as a path loss or an MCS, and calculates uplink data transmission power (TX_POWER) based on the network parameter and denotes it as B. The base station calculates a difference A−B between A and B, to obtain power headroom of the user equipment. The difference is used to represent a degree by which the transmit power of the user equipment can be further improved. A larger difference indicates higher transmit power that the user equipment has a capability to use, to support high transmit power corresponding to an uplink transmission resource scheduled through cross-slot scheduling, that is, more RB resources can be used. Therefore, no more RB resources allocated during the cross-slot scheduling are wasted, thereby supporting the base station in using a cross-slot scheduling mode to schedule an uplink transmission resource. On the contrary, a smaller difference indicates that the user equipment has a relatively low capability or is incapable of using higher transmit power, and cannot support high transmit power corresponding to an uplink transmission resource scheduled through cross-slot scheduling. In this case, even though more RB resources are allocated, the RB resources cannot be used due to the limitation of the maximum transmit power. Consequently, the base station is not supported in using a cross-slot scheduling mode to schedule an uplink transmission resource. A threshold, for example, 3 dB, is set. When A−B<3 dB, it is considered that the user equipment can support the high transmit power corresponding to the uplink transmission resource scheduled through cross-slot scheduling. In this case, the maximum power value supported by the user equipment meets the preset resource scheduling condition. When A−B≥3 dB, it is considered that the user equipment cannot support the high transmit power corresponding to the uplink transmission resource scheduled through cross-slot scheduling. In this case, the maximum power value supported by the user equipment does not meet the preset resource scheduling condition.

Figure 8:
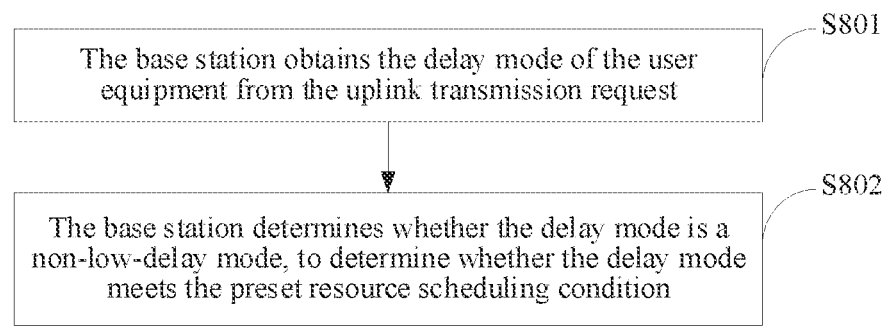
FIG. 8 is a flowchart of a method for comparing a delay mode of user equipment with a preset resource scheduling condition according to an embodiment of this application.

In some embodiments, the uplink transmission resource scheduling request includes the delay mode of the user equipment. In this case, the base station determines, based on a method shown in FIG. 8, whether the delay mode of the user equipment meets the preset resource scheduling condition.

S801. The base station obtains the delay mode of the user equipment from the uplink transmission request.

S802. The base station determines whether the delay mode is a non-low-delay mode. When the delay mode is a non-low-delay mode, the delay mode meets the preset resource scheduling condition. When the delay mode is a low-delay mode, the delay mode does not meet the preset resource scheduling condition.

A delay (delay) is a time required to transmit a packet from one terminal device to another terminal device. The delay includes a sending delay, a propagation delay, a processing delay, and a queuing delay. A low-delay mode is a delay mode in which a delay does not exceed a preset time threshold. When a data amount of uplink data does not change, the delay is mainly affected by the queuing delay. If a queuing time is relatively long, the delay is relatively high, causing the delay mode to switch from the low-delay mode to a non-low-delay mode. Compared with the default scheduling mode, the scheduling of the uplink transmission resource through cross-slot scheduling has a longer scheduling period, that is, the user equipment uses a longer time interval to transmit uplink data. Consequently, the queuing delay is prolonged, resulting in a longer total delay, causing the delay mode to switch from the low-delay mode to the non-low-delay mode. Therefore, if the user equipment has a higher requirement on the delay, that is, a low-delay mode is set, the base station is not supported in using the cross-slot scheduling mode to schedule an uplink transmission resource. On the contrary, if the user equipment has no requirement on the delay, that is, a non-low-delay mode is set, the base station can be supported in using the cross-slot scheduling mode to schedule an uplink transmission resource.

For example, for some application scenarios in which the user equipment has a relatively high requirement on the delay of the uplink data, the low-delay mode needs to be used. For example, for a vehicle wireless communication technology (vehicle to X, V2X), a vehicle (user equipment) requires a low-delay mode, that is, efficiency of the vehicle to transmit uplink data to a terminal device X (the base station) needs to be ensured, to ensure vehicle safety. The vehicle sends an uplink transmission resource scheduling request to the base station, and the request carries information indicating the low-delay mode. After receiving the uplink transmission resource scheduling request, the base station obtains the information indicating the low-delay mode therefrom, and compares the information with the preset resource scheduling condition, to determine to use a default scheduling mode. For some application scenarios in which the user equipment has no requirement on the delay of the uplink data, the non-low-delay mode is used. For example, for a video call, the user equipment (such as a mobile phone) may use a non-low-delay mode, the mobile phone sends an uplink transmission resource scheduling request to the base station, and the request carries information indicating the non-low-delay mode. After receiving the uplink transmission resource scheduling request, the base station obtains the information indicating the non-low-delay mode therefrom, and compares the information with the preset resource scheduling condition, to determine to use a cross-slot scheduling mode.

Figure 9:
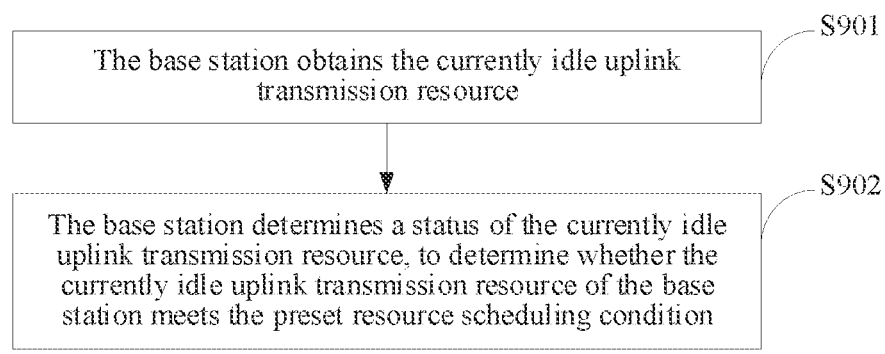
FIG. 9 is a flowchart of a method for comparing a currently idle uplink transmission resource of a base station with a preset resource scheduling condition according to an embodiment of this application.

In some embodiments, the base station may determine, by using a method shown in FIG. 9, whether the currently idle uplink transmission resource meets the preset resource scheduling condition.

S901. The base station obtains the currently idle uplink transmission resource.

S902. The base station determines a status of the currently idle uplink transmission resource. When the currently idle uplink transmission resource is in an unrestricted state, the currently idle uplink transmission resource of the base station meets the preset resource scheduling condition.

When the currently idle uplink transmission resource is in a restricted state, the currently idle uplink transmission resource of the base station does not meet the preset resource scheduling condition.

The currently idle uplink transmission resource has two states: a restricted state and an unrestricted state. The restricted state represents that the currently idle uplink transmission resource cannot be called, or cannot be used to transmit uplink data of the user equipment, or the like. The currently idle uplink transmission resource may be fully or partially restricted. For this embodiment, the partially restricted case means, in particular, that the remaining portion of the currently idle uplink transmission resource with the restricted portion removed is insufficient to support the transmission of the uplink data of the user equipment. If the currently idle uplink transmission resource of the base station is in a restricted state, it indicates that the base station can only follow the current resource scheduling mode (the default resource scheduling mode), and cannot call more uplink transmission resources to implement a cross-slot calling mode. On the contrary, if the currently idle uplink transmission resource of the base station is in an unrestricted state, it indicates that the base station can call more uplink transmission resources to implement a cross-slot calling mode.

After receiving the uplink transmission resource scheduling request, the base station needs to obtain the currently idle uplink transmission resource. For example, a currently occupied uplink transmission resource is first identified, and the currently occupied uplink transmission resource is removed from total uplink transmission resources, so that the currently idle uplink transmission resource can be obtained. Then, it is determined, based on a preset resource scheduling restriction rule, whether the currently idle uplink transmission resource is restricted. When the base station determines that the currently idle uplink transmission resource is not restricted, a cross-slot scheduling policy can be used.

In some embodiments, the base station may set other reference parameters as a basis for determining whether the cross-slot scheduling policy can be used, and set corresponding preset resource scheduling conditions based on the reference parameters.

Figure 10:
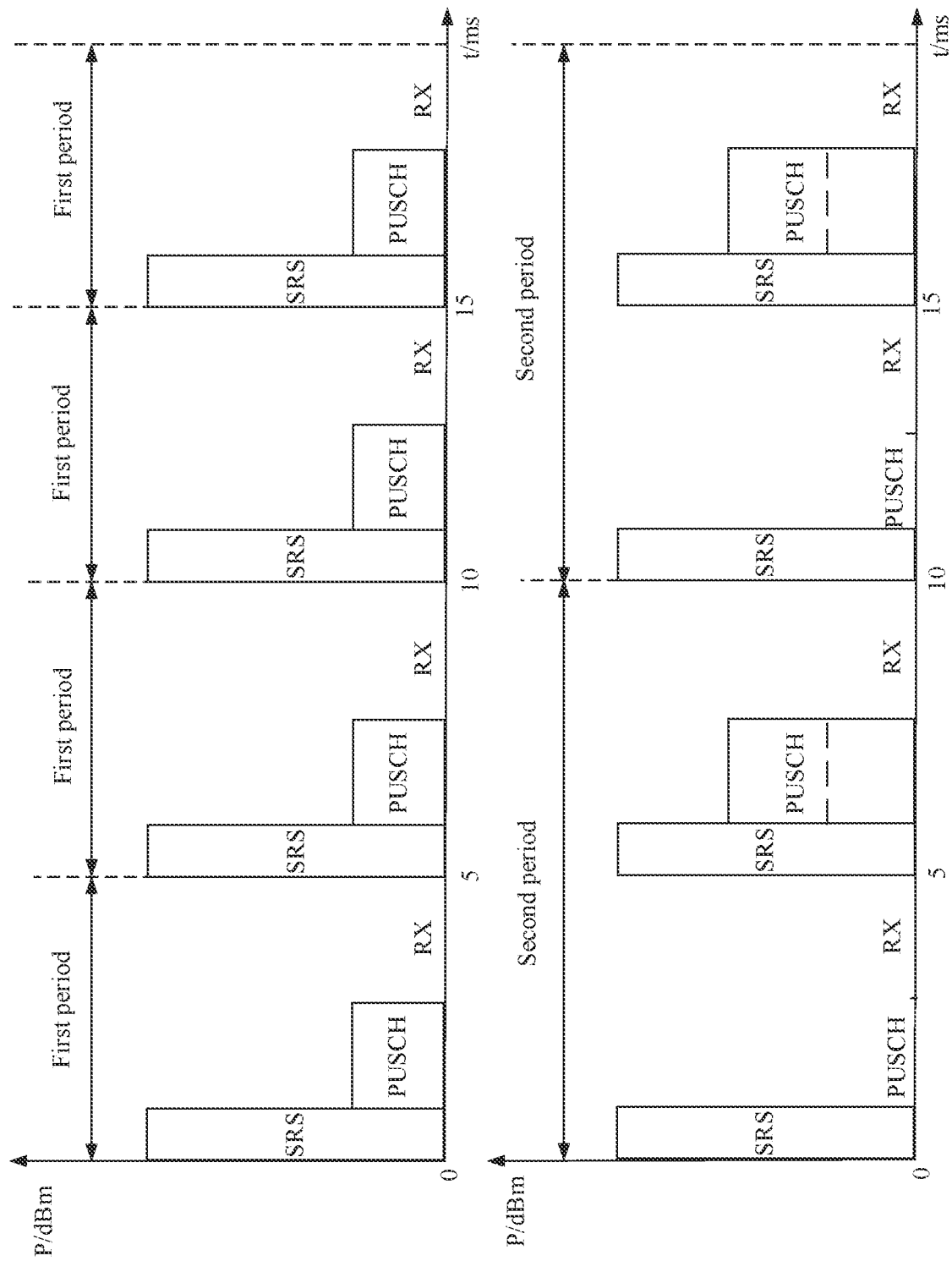
FIG. 10 is a schematic diagram of an uplink transmission resource scheduling mode according to an embodiment of this application.

When the cross-slot scheduling mode is enabled, in some embodiments, uplink transmission resources may be scheduled in a mode shown by a second histogram in FIG. 4. Compared with the first histogram, the base station uses 10 ms as a second period to schedule uplink transmission resources. The second period includes two first periods. The base station schedules the uplink transmission resources in a first first period in the second period, that is, a first PUSCH slot, and is in a dormant state in a PUSCH slot in a second first period in the second period. The quantity of uplink transmission resources scheduled by the base station is 30 RBs. In some embodiments, uplink transmission resources may be scheduled in a mode shown by a second histogram in FIG. 10. A first histogram in FIG. 10 and the first histogram in FIG. 4 represent a same uplink resource scheduling mode. Compared with the first histogram, the base station uses 10 ms as a second period to schedule uplink transmission resources. The second period includes two first periods. The base station schedules the uplink transmission resources in a second first period in the second period, that is, a second PUSCH slot, and is in a dormant state in a PUSCH slot in a first period in the second period. The quantity of uplink transmission resources scheduled by the base station is 30 RBs.

Figure 11:
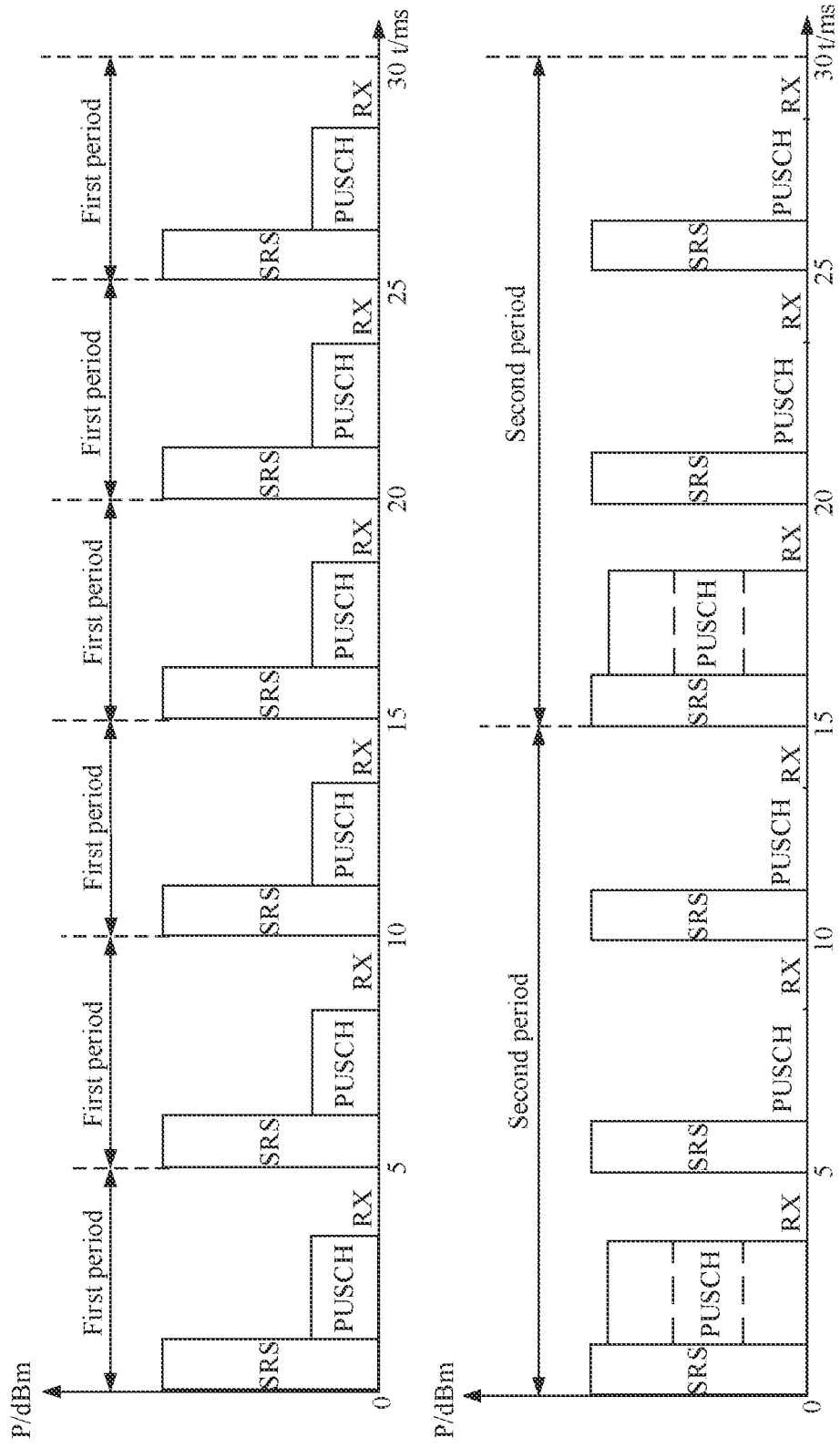
FIG. 11 is a schematic diagram of an uplink transmission resource scheduling mode according to an embodiment of this application.

Further, when the cross-slot scheduling mode is enabled, all uplink transmission resources corresponding to more first periods may be centrally scheduled in one first period according to actual requirements. As shown in FIG. 11, all uplink transmission resources corresponding to three first periods are centrally scheduled in one first period. A first histogram in FIG. 11 and the first histogram in FIG. 4 represent a same uplink resource scheduling mode. Compared with the first histogram, the base station uses 15 ms as a second period to schedule uplink transmission resources. The second period includes three first periods. The base station schedules the uplink transmission resources in a first period in the second period, that is, a first PUSCH slot, and is in a dormant state in PUSCH slots in second and third first periods in the second period. The quantity of uplink transmission resources scheduled by the base station is 45 RBs. In some embodiments, alternatively, uplink transmission resources may be centrally scheduled m the second first period or the third first period in the second period. Still further, if uplink transmission resources corresponding to more (for example, N) consecutive first periods are to be centrally scheduled within one first period, any first period (for example, an $i^{th}$ first period, where i≤N) of the N first periods may be selected for the central scheduling. For a scheduling mode thereof, refer to the scheduling modes shown in FIG. 4, FIG. 10, and FIG. 11.

Uplink power consumption of the resource scheduling policy shown by the first histogram in FIG. 4 is described as follows:

For the uplink power consumption, refer to Table 4. With 5 ms as a scheduling period, 15 RBs of uplink transmission resources are scheduled in each scheduling period, and an MCS is set to 20. In this case, the transmit power of the PA is 15.5 dBm, the transmission rate of the uplink data is 5 MHz/s, and the total power consumption is 270 mA. In this way, the bit power consumption can be calculated as 53.8 mAs/MBIT.

TABLE 4

Bit power consumption data corresponding to default resource scheduling policy

| RSRP (dBm) | RB | MCS | Power (dBm) | Rate (M/s) | Power consumption (mA) | Platform fixed power consumption (mA) | Total power consumption (mA) | mA/MBIT |
|---|---|---|---|---|---|---|---|---|
| −90 | 15 | 28 | 23.5 | — | 725 | 120 | 845 | — |
| −90 | 15 | 27 | 22.5 | — | 625 | 120 | 745 | — |
| −90 | 15 | 26 | 21.5 | — | 525 | 120 | 645 | — |
| −90 | 15 | 25 | 20.5 | 6.8 | 400 | 120 | 520 | 76.9 |
| −90 | 15 | 24 | 19.5 | 6.4 | 300 | 120 | 420 | 65.3 |
| −90 | 15 | 23 | 18.5 | 6.1 | 250 | 120 | 370 | 60.7 |

TABLE 4-continued

Bit power consumption data corresponding to default resource scheduling policy

| RSRP (dBm) | RB | MCS | Power (dBm) | Rate (M/s) | Power consumption (mA) | Platform fixed power consumption (mA) | Total power consumption (mA) | mA/MBIT |
|---|---|---|---|---|---|---|---|---|
| −90 | 15 | 22 | 17.5 | 5.8 | 200 | 120 | 320 | 55.6 |
| −90 | 15 | 21 | 16.5 | 5.2 | 175 | 120 | 295 | 56.5 |
| −90 | 15 | 20 | 15.5 | 5.0 | 150 | 120 | 270 | 53.8 |
| −90 | 15 | 19 | 14.5 | 4.8 | 140 | 120 | 260 | 53.9 |
| −90 | 15 | 18 | 13.5 | 4.6 | 135 | 120 | 255 | 56.0 |
| −90 | 15 | 17 | 12.5 | 4.2 | 125 | 120 | 245 | 58.1 |
| −90 | 15 | 16 | 11.5 | 3.9 | 110 | 120 | 230 | 59.2 |
| −90 | 15 | 15 | 10.5 | 3.7 | 95 | 120 | 215 | 58.4 |
| −90 | 15 | 14 | 9.5 | 3.5 | 75 | 120 | 195 | 56.0 |
| −90 | 15 | 13 | 8.5 | 3.3 | 65 | 120 | 185 | 56.4 |
| −90 | 15 | 12 | 7.5 | 2.9 | 60 | 120 | 180 | 61.1 |
| −90 | 15 | 11 | 6.5 | 2.5 | 50 | 120 | 170 | 66.8 |
| −90 | 15 | 10 | 5.5 | 2.3 | 45 | 120 | 165 | 70.4 |
| −90 | 15 | 9 | 4.5 | 2.1 | 40 | 120 | 160 | 74.7 |

Uplink power consumption of the resource scheduling policy shown by the second histogram in FIG. 4 is described as follows:

For the uplink power consumption, refer to Table 5. After the cross-slot scheduling is enabled, with 10 ms as a scheduling period, 30 RBs of uplink transmission resources are scheduled in each scheduling period, and an MCS is set to 20. In this case, the transmit power of the PA is 18.5 dBm, the transmission rate of the uplink data is 10 MH-z/s, and the total power consumption is 370 mA. In this way, the bit power consumption can be calculated as 36.8 mAs/MBIT.

TABLE 5

Bit power consumption data corresponding to resource scheduling policy of cross-slot scheduling

| RSRP (dBm) | RB | MCS | Power (dBm) | Rate (M/s) | Power consumption (mA) | Platform fixed power consumption (mA) | Total power consumption (mA) | mA/MBIT |
|---|---|---|---|---|---|---|---|---|
| −90 | 15 | 25 | 23.5 | 13.5 | 725 | 120 | 845 | 62.5 |
| −90 | 15 | 24 | 22.5 | 12.9 | 625 | 120 | 745 | 57.9 |
| −90 | 15 | 23 | 21.5 | 12.2 | 525 | 120 | 645 | 52.9 |
| −90 | 15 | 22 | 20.5 | 11.5 | 400 | 120 | 520 | 45.1 |
| −90 | 15 | 21 | 19.5 | 10.4 | 300 | 120 | 420 | 40.2 |
| −90 | 15 | 20 | 18.5 | 10.0 | 250 | 120 | 370 | 36.8 |
| −90 | 15 | 19 | 17.5 | 9.6 | 200 | 120 | 320 | 33.2 |
| −90 | 15 | 18 | 16.5 | 9.1 | 175 | 120 | 295 | 32.4 |
| −90 | 15 | 17 | 15.5 | 8.4 | 150 | 120 | 270 | 32.0 |
| −90 | 15 | 16 | 14.5 | 7.8 | 140 | 120 | 260 | 33.5 |
| −90 | 15 | 15 | 13.5 | 7.4 | 135 | 120 | 255 | 34.6 |
| −90 | 15 | 14 | 12.5 | 7.0 | 125 | 120 | 245 | 35.2 |
| −90 | 15 | 13 | 11.5 | 6.6 | 110 | 120 | 230 | 35.0 |
| −90 | 15 | 12 | 10.5 | 5.9 | 95 | 120 | 215 | 36.5 |
| −90 | 15 | 11 | 9.5 | 5.1 | 75 | 120 | 195 | 38.3 |
| −90 | 15 | 10 | 8.5 | 4.7 | 65 | 120 | 185 | 39.5 |
| −90 | 15 | 9 | 7.5 | 4.3 | 60 | 120 | 180 | 42.0 |
| −90 | 15 | 8 | 6.5 | 3.9 | 50 | 120 | 170 | 43.8 |
| −90 | 15 | 7 | 5.5 | 3.5 | 45 | 120 | 165 | 47.4 |
| −90 | 15 | 6 | 4.5 | 3.1 | 40 | 120 | 160 | 51.9 |

It can be learned that, in a case that the data amount of the uplink data remains unchanged, after the cross-slot scheduling policy is used, a power consumption gain is approximately 30% and the data transmission rate is not affected.

After determining the resource scheduling policy, the base station generates a corresponding resource scheduling result. For example, if it is determined that the resource scheduling policy is the default resource scheduling mode, with FIG. 4 as an example, the resource scheduling result is that the scheduling period is a first period of 5 ms, uplink transmission resources scheduled in each first period are 15 RBs, and the PUSCH slot is indicated. If it is determined that the resource scheduling policy is the cross-slot scheduling mode, with FIG. 4 as an example, the resource scheduling result is that the scheduling period is a second period of 10 ms, uplink transmission resource scheduled in each second period are 30 RBs, and a PUSCH slot is indicated. After receiving the resource scheduling result, the base station obtains the corresponding uplink transmission resources according to the scheduling period in the resource scheduling result, and transmits uplink data in the indicated PUSCH slot by using the uplink transmission resources.

It may be understood that, to implement the foregoing functions, the base station includes corresponding hardware structures and/or software modules for performing the functions. A person skilled in the art should be easily aware that, in combination with the units and algorithm steps of the examples described in the embodiments disclosed in this specification, this application can be implemented by hardware or a combination of hardware and computer software. Whether a function is performed by hardware or computer software driving hardware depends on particular applications and design constraints of the technical solutions. A person skilled in the art may use different methods to implement the described functions for each particular application, but it should not be considered that the implementation goes beyond the scope of this application.

For example, the foregoing base station can implement the corresponding functions through software modules.

Figure 12:
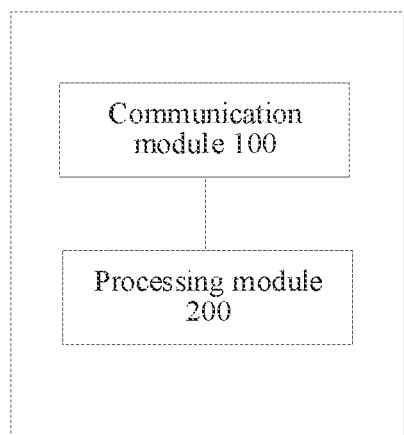
FIG. 12 is a schematic diagram of software modules of a base station according to an embodiment of this application.

In an embodiment, as shown in FIG. 12, the based station for implementing the foregoing functions includes, a communication module 100 and a processing module 200. The communication module 100 is configured to receive an uplink transmission resource scheduling request sent by user equipment.

The processing module 200 is configured to receive, after the uplink transmission resource scheduling request is received, whether each preset parameter meets a preset resource scheduling condition. The processing module 200 is further configured to schedule an uplink transmission resource within each first period when at least one of the preset parameters does not meet the preset resource scheduling condition, where the first period is a default scheduling period of the base station; and schedule an uplink transmission resource within each second period when all of the preset parameters meet the preset resource scheduling condition, where the second period includes N consecutive first periods, the base station centrally schedules all uplink transmission resources corresponding to the N first periods within an $i^{th}$ first period among the N first periods, and N≥2.

In an implementation, the processing module 200 is further configured to calculate a resource scheduling parameter based on the preset parameters and the preset resource scheduling condition, where the resource scheduling parameter is 1 when all of the preset parameters meet the preset resource scheduling condition, and the resource scheduling parameter is 0 when at least one of the preset parameters does not meet the preset resource scheduling condition. The processing module 200 is further configured to schedule the uplink transmission resource based on the resource scheduling parameter.

In an implementation, the preset parameters include a maximum power value supported by the user equipment, a delay mode of the user equipment, and a currently idle uplink transmission resource of the base station.

In an implementation, that the processing module 200 determines whether the maximum power value supported by the user equipment meets the preset resource scheduling condition includes: obtaining the maximum power value supported by the user equipment from the uplink transmission resource scheduling request; obtaining a network parameter, calculating uplink data transmission power based on the network parameter; calculating a difference between the uplink data transmission power and the maximum power value supported by the user equipment; and determining whether the difference is greater than or equal to a preset threshold, to determine whether the maximum power value supported by the user equipment meets the preset resource scheduling condition, where when the difference is greater than or equal to the preset threshold, the maximum power value supported by the user equipment meets the preset resource scheduling condition.

In an implementation, that the processing module 200 determines whether the delay mode of the user equipment meets the preset resource scheduling condition includes: obtaining the delay mode of the user equipment from the uplink transmission request; and determining whether the delay mode is a non-low-delay mode, to determine whether the delay mode meets the preset resource scheduling condition, where when the delay mode is a non-low-delay mode, the delay mode meets the preset resource scheduling condition.

In an implementation, that the processing module 200 determines whether the currently idle uplink transmission resource of the base station meets the preset resource scheduling condition includes: obtaining the currently idle uplink transmission resource: and determining a status of the currently idle uplink transmission resource, to determine whether the currently idle uplink transmission resource of the base station meets the preset resource scheduling condition, where when the currently idle uplink transmission resource is in an unrestricted state, the currently idle uplink transmission resource of the base station meets the preset resource scheduling condition.

In an implementation, the uplink transmission resource scheduling request includes an amount of uplink data to be transmitted, and the processing module 200 is further configured to obtain the amount of uplink data to be transmitted from the uplink transmission resource scheduling request; and calculate, based on the amount of uplink data to be transmitted, an uplink transmission resource to be scheduled within each of the first periods.

The foregoing user equipment can implement the corresponding functions through software modules.

Figure 13:
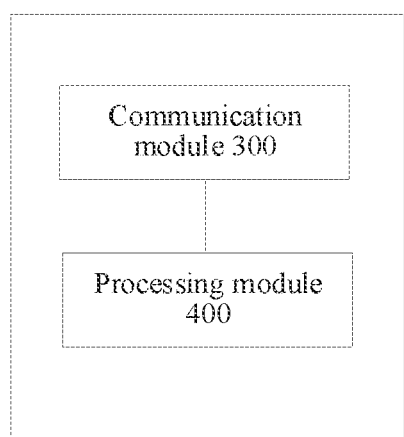
FIG. 13 is a schematic diagram of software modules of user equipment according to an embodiment of this application.

In an embodiment, as shown in FIG. 13, the user equipment for implementing the foregoing functions includes: a communication module 300 and a processing module 400. The communication module 300 is configured to send an uplink transmission resource scheduling request to a base station.

The communication module 300 is further configured to receive a resource scheduling result sent by the base station, where the base station schedules an uplink transmission resource based on the method described above.

The processing module 400 is configured to transmit, based on the resource scheduling result by using a corresponding uplink transmission resource, uplink data to be transmitted.

In an implementation, the uplink transmission resource scheduling request includes a maximum power value supported by the user equipment and a delay mode of the user equipment.

An embodiment of this application further provides a communication system, including a base station and user equipment. There may be one or more user equipments. Each user equipment requests scheduling of an uplink transmission resource from a base station based on the method described above, and transmits uplink data based on a resource scheduling result sent by the base station. The base station schedules an uplink transmission resource for each user equipment based on the method described above.

The foregoing specific implementations further describe in detail the objectives, technical solutions, and beneficial effects of the present invention. It should be understood that the foregoing descriptions are merely specific implementations of the present invention, but are not intended to limit the protection scope of the present invention. Any modification, equivalent replacement, or improvement made based on the technical solutions of the present invention should fall within the protection scope of the present invention.

What is claimed is:

1. A method, comprising:
   receiving an uplink transmission resource scheduling request from a user equipment;
   scheduling an uplink transmission resource within each first period when at least one preset parameter associated with the uplink transmission resource scheduling request does not meet a preset resource scheduling condition, wherein the first period is a default scheduling period of a base station, and wherein the first period comprises a time slot corresponding to a sounding reference signal (SRS), and a time slot corresponding to a physical upstream shared channel (PUSCH), and wherein the uplink transmission resource refers to a transmission resource corresponding to the PUSCH; and
   scheduling an uplink transmission resource within each second period when all of the preset parameters meet the preset resource scheduling condition, wherein the second period comprises N consecutive first periods, wherein the base station centrally schedules all uplink transmission resources corresponding to the N first periods on the time slot corresponding to PUSCH within an $i^{th}$ first period among the N first periods, and wherein N≥2, and N≥i≥1.

2. The method of claim 1, further comprising:
   calculating a resource scheduling parameter based on the preset parameters and the preset resource scheduling condition, wherein the resource scheduling parameter is 1 when all of the preset parameters meet the preset resource scheduling condition, and the resource scheduling parameter is 0 when at least one of the preset parameters does not meet the preset resource scheduling condition; and
   scheduling the uplink transmission resource based on the resource scheduling parameter.

3. The method of claim 1, wherein the preset parameters comprise a maximum power value supported by the user equipment, a delay mode of the user equipment, and a currently idle uplink transmission resource of the base station.

4. The method of claim 3, further comprising:
   obtaining the maximum power value supported by the user equipment from the uplink transmission resource scheduling request;
   obtaining a network parameter;
   calculating an uplink data transmission power based on the network parameter; and
   wherein the maximum power value supported by the user equipment meets the preset resource scheduling condition when a difference between the uplink data transmission power and the maximum power value supported by the user equipment is greater than or equal to a preset threshold.

5. The method of claim 3, further comprising obtaining the delay mode of the user equipment from the uplink transmission resource scheduling request, wherein the delay mode meets the preset resource scheduling condition when the delay mode is a non-low-delay mode.

6. The method of claim 3, further comprising obtaining the currently idle uplink transmission resource, wherein the currently idle uplink transmission resource of the base station meets the preset resource scheduling condition when the currently idle uplink transmission resource is in an unrestricted state.

7. The method of claim 1, wherein the uplink transmission resource scheduling request comprises an amount of uplink data to be transmitted, and wherein an uplink transmission resource to be scheduled within each of the first periods is based on the amount of uplink data to be transmitted.

8. A method, comprising:
   sending an uplink transmission resource scheduling request to a base station;
   receiving a resource scheduling result from the base station; and
   transmitting, based on the resource scheduling result by using a corresponding uplink transmission resource, uplink data to the base station to be transmitted,
   wherein the base station schedules an uplink transmission resource within each first period when at least one preset parameter associated with the uplink transmission resource scheduling request does not meet a preset resource scheduling condition, wherein the first period is a default scheduling period of the base station, and wherein the first period comprises a time slot corresponding to a sounding reference signal (SRS), and a time slot corresponding to a physical upstream shared channel (PUSCH), and wherein the uplink transmission resource refers to a transmission resource corresponding to the PUSCH, and
   wherein the base station schedules an uplink transmission resource within each second period when all of the preset parameters meet the preset resource scheduling condition, wherein the second period comprises N consecutive first periods, wherein the base station centrally schedules all uplink transmission resources corresponding to the N first periods on the time slot corresponding to PUSCH within an $i^{th}$ first period among the N first periods, and wherein N≥2, and N≥i≥1.

9. The method of claim 8, wherein the uplink transmission resource scheduling request comprises a maximum power value supported by a user equipment and a delay mode of the user equipment.

10. The method of claim 9, wherein the preset parameters comprise a maximum power value supported by the user equipment, a delay mode of the user equipment, and a currently idle uplink transmission resource of the base station.

11. The method of claim 10, wherein the maximum power value supported by the user equipment meets the preset resource scheduling condition when a difference between an uplink data transmission power and the maximum power value supported by the user equipment is greater than or equal to a preset threshold.

12. The method of claim 10, wherein the delay mode meets the preset resource scheduling condition when the delay mode is a non-low-delay mode.

13. The method of claim 10, wherein the currently idle uplink transmission resource of the base station meets the preset resource scheduling condition when the currently idle uplink transmission resource is in an unrestricted state.

14. The method of claim 8, wherein the uplink transmission resource scheduling request comprises an amount of uplink data to be transmitted, and wherein an uplink transmission resource to be scheduled within each of the first periods is based on the amount of uplink data to be transmitted.

15. A base station, comprising:
   a transceiver configured to receive an uplink transmission resource scheduling request from a user equipment; and
   a processor coupled to the transceiver, wherein the processor is configured to:

schedule an uplink transmission resource within each first period when at least one preset parameter associated with the uplink transmission resource scheduling request does not meet a preset resource scheduling condition, wherein the first period is a default scheduling period of the base station, and wherein the first period comprises a time slot corresponding to a sounding reference signal (SRS), and a time slot corresponding to a physical upstream shared channel (PUSCH), and wherein the uplink transmission resource refers to a transmission resource corresponding to the PUSCH; and schedule an uplink transmission resource within each second period when all of the preset parameters meet the preset resource scheduling condition, wherein the second period comprises N consecutive first periods, wherein the base station centrally schedules all uplink transmission resources corresponding to the N first periods on the time slot corresponding to PUSCH within an $i^{th}$ first period among the N first periods, and wherein N≥2, and N≥i≥1.

16. The base station of claim 15, wherein the processor is further configured to:
calculate a resource scheduling parameter based on the preset parameters and the preset resource scheduling condition, wherein the resource scheduling parameter is 1 when all of the preset parameters meet the preset resource scheduling condition, and the resource scheduling parameter is 0 when at least one of the preset parameters does not meet the preset resource scheduling condition; and
schedule the uplink transmission resource based on the resource scheduling parameter.

17. The base station of claim 15, wherein the preset parameters comprise a maximum power value supported by the user equipment, a delay mode of the user equipment, and a currently idle uplink transmission resource of the base station.

18. The base station of claim 17, wherein the processor is further configured to:
obtain the maximum power value supported by the user equipment from the uplink transmission resource scheduling request;
obtain a network parameter;
calculate an uplink data transmission power based on the network parameter; and
wherein the maximum power value supported by the user equipment meets the preset resource scheduling condition when a difference between the uplink data transmission power and the maximum power value supported by the user equipment is greater than or equal to a preset threshold.

19. The base station of claim 17, wherein the processor is further configured to obtain the delay mode of the user equipment from the uplink transmission resource scheduling request, wherein the delay mode meets the preset resource scheduling condition when the delay mode is a non-low-delay mode.

20. The base station of claim 17, wherein the processor is further configured to obtain the currently idle uplink transmission resource, wherein the currently idle uplink transmission resource of the base station meets the preset resource scheduling condition when the currently idle uplink transmission resource is in an unrestricted state.

* * * * *